United States Patent
Lingala et al.

(10) Patent No.: US 11,430,310 B2
(45) Date of Patent: Aug. 30, 2022

(54) ENHANCED SECURITY IN ACCESS CONTROL SYSTEMS

(71) Applicant: Carrier Corporation, Palm Beach Gardens, FL (US)

(72) Inventors: Ramesh Lingala, Telangana (IN); Srinivas Korrawat, Telangana (IN); HarishBabu Manam, Telangana (IN); Adam Kuenzi, Silverton, OR (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 17/133,824

(22) Filed: Dec. 24, 2020

(65) Prior Publication Data
US 2021/0201637 A1    Jul. 1, 2021

(30) Foreign Application Priority Data

Dec. 27, 2019  (IN) .............................. 201911054257

(51) Int. Cl.
*B60R 25/00*     (2013.01)
*G08B 13/08*    (2006.01)

(52) U.S. Cl.
CPC .................................... *G08B 13/08* (2013.01)

(58) Field of Classification Search
None
See application file for complete search history.

(56) References Cited

U.S. PATENT DOCUMENTS

| | | | |
|---|---|---|---|
| 6,624,742 B1* | 9/2003 | Romano | G06Q 50/16 340/12.5 |
| 2007/0005201 A1* | 1/2007 | Chenn | H04W 4/40 701/31.5 |
| 2007/0159297 A1* | 7/2007 | Paulk | B60R 25/104 340/5.33 |
| 2007/0185627 A1 | 8/2007 | Mavreas | |
| 2007/0273534 A1 | 11/2007 | McGinn et al. | |
| 2008/0246587 A1* | 10/2008 | Fisher | E05B 19/0005 340/5.73 |
| 2017/0178035 A1 | 6/2017 | Grimm et al. | |
| 2019/0139337 A1 | 5/2019 | Briskey | |
| 2019/0304208 A1 | 10/2019 | Chen et al. | |
| 2019/0371096 A1* | 12/2019 | Fisher | G07C 9/00904 |

FOREIGN PATENT DOCUMENTS

CN          110033533 A       7/2019

OTHER PUBLICATIONS

European Search Report for application RP 20212435.0, dated May 27, 2021, 9 pages.

* cited by examiner

*Primary Examiner* — John F Mortell
(74) *Attorney, Agent, or Firm* — Cantor Colburn LLP

(57) ABSTRACT

A method, system, and devices for providing enhanced security to access control systems. The system includes a user device, a first device and a second device. The user device sends a command to the first device. The command is further authorized to enable a communication between the first device and the second device. In an event of any security breach on the second device, the second device may generate an alert and transmit the same to the first device. In response to the alert, the first device may sound an alarm or siren for the concerned user.

16 Claims, 5 Drawing Sheets

ENHANCED SECURITY IN ACCESS CONTROL SYSTEMS

FOREIGN PRIORITY

This application claims priority to Indian Patent Application No. 201911054257, filed Dec. 27, 2019, and all the benefits accruing therefrom under 35 U.S.C. § 119, the contents of which in its entirety are herein incorporated by reference.

TECHNICAL FIELD OF INVENTION

The present invention relates generally to a security system. More particularly, the invention relates to an apparatus and method for detecting an intrusion in the security system.

BACKGROUND OF THE INVENTION

A car lot has multiple cars parked with their respective keys kept in a lockbox or a keybox. The keybox or the lockbox may be inside or outside the car. A car owner or an authorized person may open the keybox in the car lot using credentials using valid credentials or PIN or a button placed around keybox. The keybox may also be opened by wirelessly transmitting the credentials from a mobile device.

Once the keybox is opened, the user may retrieve the car keys of the car and can use the same to drive away the car. However, there may be chances of stealing cars by taking car keys from the keybox using battery-powered tools or tampering the keybox physically for removing the keys. The keybox may also be opened enough manually to let the signal from the key to simply unlock the door and start the car.

If the keybox is placed inside the car, the car window may be broken by an intruder to access and tamper the lockbox or the keybox. On tampering the lockbox, the car can be stolen away easily as described above.

The above instances and examples clearly indicate that by merely locking the keys in the keybox for security of the keys is not enough and is not a fool proof solution.

Therefore, there is a need in the art to develop methods and systems for providing enhanced security to the keybox and the intended vehicle.

SUMMARY OF THE INVENTION

Various embodiments of the invention describe a method of receiving a first command from the user device by a first device. The first command is authorized to enable a communication between the first device and the second device. An alert message is received from the second device and an alarm is issued by the first device based on the alert message.

In another embodiment of the invention, the first command is transmitted from the user device to the second device and then transmitted to the first device.

In an embodiment of the invention, the alert message is issued by the second device to the first device after enabling the communication between the first device and the second device.

In yet another embodiment of the invention, issuing the alarm by the first device comprises sending one or more signals via an interface associated with the first device to cause a vehicle to enter an alarm state.

In another embodiment of the invention, the alert message on the second device is generated when there is a physical attack or an unauthorized access on the second device.

In still another embodiment of the invention, the alert message generated by the second device is sent to a plurality of first devices and each of the plurality of first devices issue an alarm to enter an alarm state.

In another embodiment of the invention, the alarm issued by the first device is transmitted to a third device, wherein the third device is a camera to take images, a siren, flashing lights, or a device to send message to an authority.

In still another embodiment of the invention, the first command is transmitted from the user device to the first device and then transmitted to the second device to enable a communication between the first device and the second device.

In another embodiment of the invention, the second device receives a second command from a user device to lock/unlock the second device.

In yet another embodiment of the invention, the second device comprises an accessing module communicably coupled with the first device and the accessing module communicates with the first device to access a vehicle.

In still another embodiment of the invention, the first device is an on-board diagnostics device associated with a vehicle.

In an embodiment of the invention, the second device is located inside the vehicle and the second device is enabled to communicate with the first device on receiving the first command from the user device.

In another embodiment of the invention, a system a disclosed. The system comprises a user device configured to communicate with a first device and a second device. The first device receives a first command from the user device. The system further comprises a second device enabled to communicate with the first device after authorization of the first command by the first device. The second device is configured to trigger an alert message to the first device based on the detection. The first device issues an alarm based on the alert message.

In another embodiment of the invention, the first command is transmitted from the user device to the second device and then transmitted to the first device.

In yet another embodiment of the invention, the alert message on the second device is generated when there is a physical attack or an unauthorized access on the second device.

In another embodiment of the invention, the second device comprises an accessing module communicably coupled with the first device and the accessing module communicates with the first device to access a vehicle.

In still another embodiment of the invention, the first device is an on-board diagnostics device associated with the vehicle.

In yet another embodiment of the invention, the second device is located inside the vehicle and the second device is enabled to communicate with the first device on receiving an unlock command from the user device.

In still another embodiment of the invention, the alert message is issued by the second device to the first device after enabling the communication between the first device and the second device.

In another embodiment of the invention, the alert message is issued by the second device to the first device after enabling the communication between the first device and the second device.

In various other embodiments of the invention a computer readable medium is disclosed comprising one or more processors and a memory coupled to the one or more processors. The memory stores instructions which are executed by the one or more processors to receive a first command from a user device by a first device. The instructions are executed to authorize the first command to enable a communication between the first device and the second device. The instructions are executed to receive an alert message from the second device and issue an alarm by the first device based on the alert message.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

Corresponding reference numerals indicate corresponding parts throughout the drawings.

DETAILED DESCRIPTION OF THE INVENTION

Figure 1:
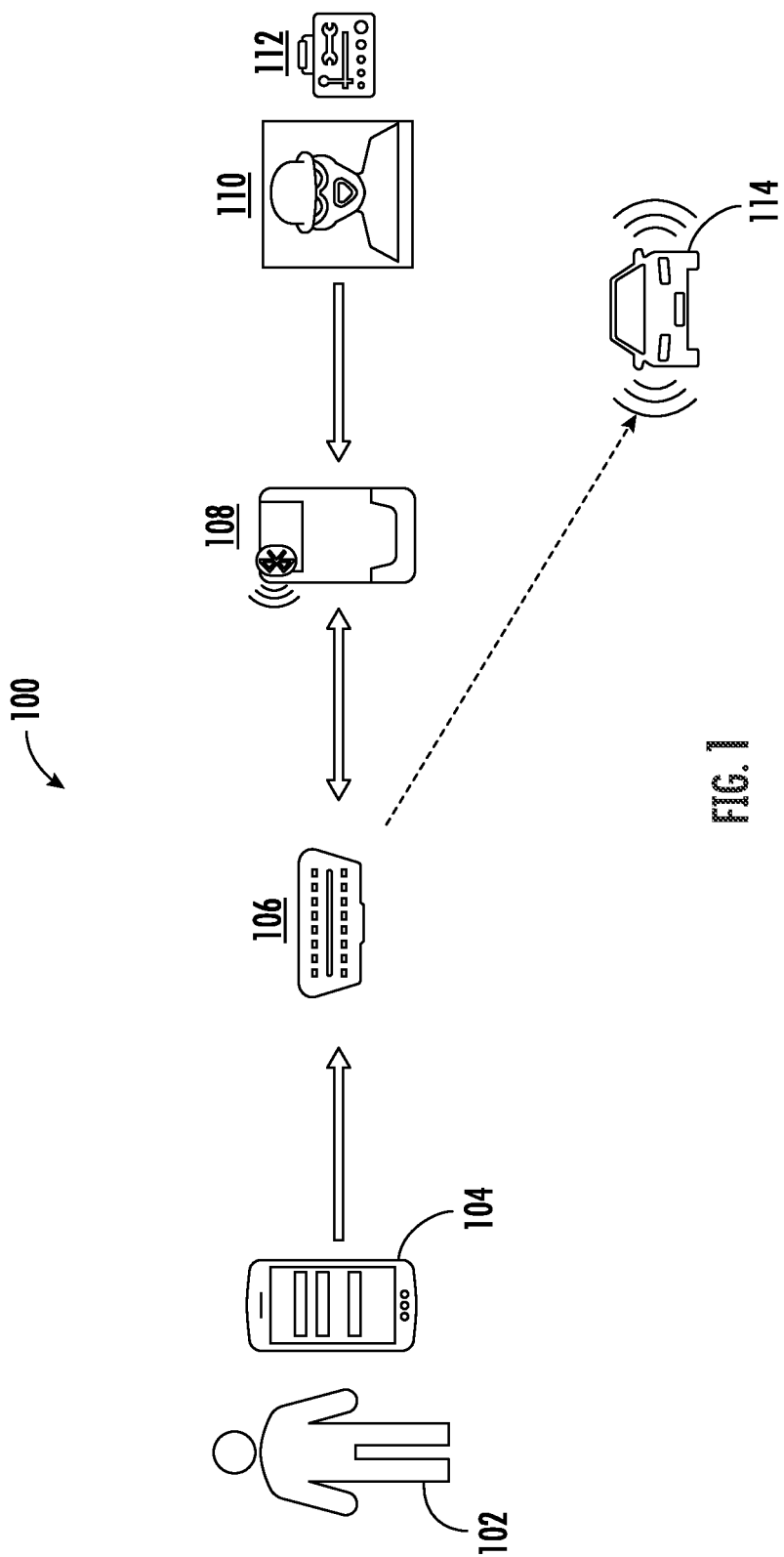
FIG. 1 is an exemplary diagram illustrating a system in accordance with an embodiment of the invention.

Described herein is the technology with systems, methods, and devices for providing enhanced security to the keybox and the associated vehicle or any premises. In different embodiments of the invention described is a user device, a first device and a second device. The first device is configured to receive a command from the user device. The command is further transmitted to a second device. The command is authorized to enables a communication between the first device and the second device. The communication between the first device and the second device may be a bidirectional communication to exchange different types of information between the first device and the second device. In an event of detection of an unauthorized event (second device being tampered by an intruder) by the second device, an alert message may be transmitted from the second device to the first device. The first device, on receiving the alert message may trigger an alarm.

In an exemplary embodiment of the invention, the unauthorized access of the second device may be by an intruder using battery powered tools or physically damaging the second device. In another embodiment of the invention, the unauthorized access may comprise stealing the second device from it's original location. The unauthorized access of the second device by the intruder corresponds to use of unlawful means to access the second device.

As described herein, the first device, the second device may be located inside premises. The premises may be a car lot, parking lot, a garage, storage unit, a warehouse, a room, a building, home, banks, offices, malls, colleges, hospitals, and/or or any such premises where different devices (such as first device and the second device) are present and can communicate with each other.

As described herein, the command issued by the user device may act as an identifier of the associated user. The command may comprise unique identifier associated with the user (for example, user device), user details, vehicle details, and the like. The command from the user device through the first device and ultimately to the second device establishes a relationship between the first device and the second device. Thus, the first device and the second device may identify each other by the virtue of a common user. The command may include the unique identifier from the user device which is transmitted to the first device and further forwarded to the second device to establish a common relationship between the user device, first device and the second device.

As described herein, the user device may be any hand held device such as a smartphone or a tablet and the like with at least a display, a storage unit and network connectivity. As an example, the hand held device may be an Apple® tablet or smartphone, an Android® tablet or smartphone, a Windows® tablet or smartphone and/or the like. The user device may have application stored therein which is executed to perform various operations. The application on the user device may store credentials to access the first device or the second device. The credential may be in the form of a mobile credential, digital certificate, and digital key, personal Identification number (PIN), a password and the like.

As described herein, the first device may comprise, but is not limited to, a transmitter, a receiver, an alarm triggering unit, a validation unit, a processor and/or memory, an interface unit and other such units. The first device may have capability to communicate with different devices (such as the user device and the second device) via network communication. In an exemplary embodiment of the invention, the first device may be an on-board diagnostics device associated with a vehicle. In general, the on-board diagnostics device may evaluate different parameters of a vehicle such as a car. The on-board diagnostics device may also trigger an alarm if there is an attempt to tamper the vehicle. The alarm may be in the form of flashing lights or sounding a horn of the vehicle.

As described herein, the second device may an accessing device or lock. The second device may comprise, but is not limited to, a transmitter, a receiver, an alert generation unit, identification unit, a validation unit, a processor and/or memory, an interface unit and other such units. The second device may have capability to interact with different devices using a short-range communication. The second device may also interact with a server or cloud for validating the access on the second device. The second device may be a lock, a keybox, a lockbox to place items required to be placed securely. For example, the second device may include accessing modules such as keys of the vehicle. The accessing module placed inside the second device is also capable of communicating with the first device to access the vehicle. In particular, a fob may be associated with the keys. The fob may include a communication module which may communicate with the first device. In an embodiment of the invention, in an event of tampering of the second device, the accessing module inside the second device may transmit an alert message to the first device.

The communication between the user device and the first device may refer to a Bluetooth, a ZigBee communication, WiFi communication a cellular communication (such as Global System for Mobile (GSM), a Long-Term Evolution (LTE) communication, a code-division multiple access (CDMA) communication, a narrow-band internet of thing (NB-IoT) technique or category M1 technique)), or any such network/technique that is known in the art.

The communication between the first device and the second device may be a short-range communication. The short-range communication may be a Wi-Fi communication, a Bluetooth communication, a Zigbee communication and any other such communication known in the art.

As described herein, the alert may be an audio alert or a visual alert. The alert may also be in the form of a buzzer, a siren, an alarm, or a display, flashing of lights, sending a message to an authority or any other alert means known to a person skilled in the art. The alert may be sent to a third device such as camera to capture images of the intruder, a siren, a flashing light device, a user equipment such as a mobile device of any authority.

Turning now to figures, FIG. 1 depicts a system 100 for providing enhanced security in a security system. The system comprises a user device 104 operated by a user 102. The user device 104 includes a user application and at least a communication unit. The user device may communicate with other devices. Further, the user application installed on the user device 104 may be configured to control the functionality of other devices. For example, the user application on the user device 104 may be configured to interact with a first device 106 in the system 100. The user application may also interact with the second device 108. The user device 104 may send a command to a second device 108. The second device 108 may further transmit the command to a first device 106. On receiving the command by the first device 106, the command is authorized and a communication is established between the first device 106 and the second device 108. The communication may be a bidirectional communication between the first device 106 and the second device 108. It is to be noted that the command may include an identifier associated with the user to uniquely identify the associated user. On receipt of such an identifier, the second device 108 may determine that the first device 106 is associated with the user 102.

In another embodiment of the invention, the user device 104 may transmit the command to the first device 106 which further transmits the command to the second device 108. The first device 106 or the second device 108 may authorize the command to enable communication between the first device 106 and the second device 108. The communication between the first device 106 and the second device 108 thus established may be a bidirectional communication.

In an event of tampering or attack on the second device (for example, keybox), the second device would detect such an unauthorized event and initiate an alert to the first device 106. In general, the second device may be accessed using an authorized PIN, password, biometrics, or other means of authentication known to a person skilled in the art.

On receiving the alert from the second device 108, the first device 106 will trigger an alarm or siren for alerting a concerned user (for example, a security personnel of the premises). In an exemplary embodiment, the first device may generate the alarm of a vehicle parked in a car lot. This will alert the security team in the premises regarding an unlawful activity.

There is a technical advantage of enabling communication between the first device 106 and the second device 108. The user device 104 is not required to be within the premises to know about the tampering or unauthorized access of the second device. Also, even when there is no communication between the user device and the second device, still the alarm can be triggered and notified to the concerned user. Once the command from the user device reaches the second device via the first device, the first device and the second device may communicate with each other when required. In this case, there is no need of the user device to remain in communication with the first device and the second device.

As an exemplary embodiment shown in the FIG. 1, the user device 104 may establish a communication with the first device 106 and may initiate a command to unlock a vehicle via the first device 106.

Consider an exemplary embodiment where a vehicle is parked in a parking area. The vehicle includes an on-board diagnostics device (first device). The parking also includes a keybox (second device) where the keys of the vehicle may be stored. The vehicle may be associated with a user device. The user device may send an unlock command to the keybox to open the keybox. The unlock command may be authorized by the keybox. On successful opening of the keybox, the user device may further send a first command to the keybox which further transmits the same command to the on-board diagnostics device associated with the vehicle. On receiving the command, the on-board diagnostics device understands that a bidirectional communication is required to be established with the keybox. Accordingly, the on-board diagnostics device and the keybox are able to communicate with each other. If the keybox is tempered by an intruder, the keys may be compromised. In this situation, the keybox may detect the intrusion by the intruder and generate an alert corresponding to the intrusion. The alert is sent to the on-board diagnostics device which triggers the alarm of the vehicle indicating a breach in security. The alarm may be issued by the first device in the form of signals via an interface such that an associated vehicle enters into an alarm state.

Alternatively, the alert message may be sent to a plurality of first devices associated with each of the vehicle in the premises (such as parking). The plurality of first devices may be configured to cause each of the vehicle to enter into an alarm state.

In another embodiment of the invention, the command may be sent from the user device to the on-board diagnostics device which in turn transmits the command further to the keybox. The command may be authorized by the on-board diagnostics device/keybox and a communication may be established between the keybox and the on-board diagnostics device. Before sending the first command to the on-board diagnostics device, the user device may send an unlock command to the first device to open the doors of a vehicle. Subsequently, the first command may be sent to the first device as described herein.

In an embodiment of the invention, the second device may be placed inside a vehicle. As discussed above, the first device is associated with the vehicle. The user device may transmit another command (for example, an unlock command) to the first device. The unlock command may open the doors of the vehicle. At the same time, the unlock command is relayed to the second device. On receipt of the unlock command from the first device, the second device determines that a bidirectional communication is required to be established with the first device. The unlock command may comprise an identifier to indicate that the first device is associated with the user of the user device.

Once the communication between the first device and the second device is established, if the security of the car is compromised and the second device (e.g. a keybox) is attacked, the second device may issue an alert to the first device which may sound an alarm or siren indicating a security breach of the vehicle.

Figure 2:
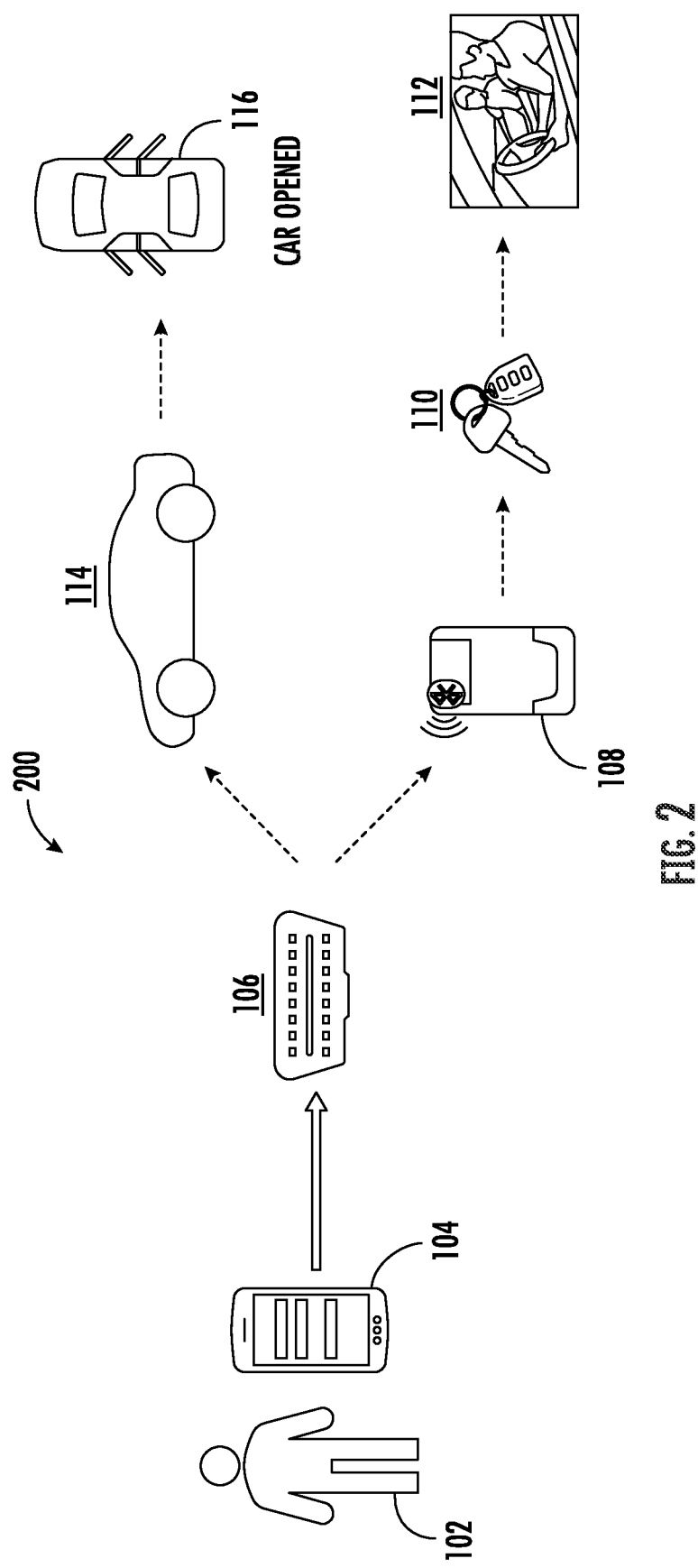
FIG. 2 is an exemplary diagram illustrating a system in accordance with another embodiment of the invention.

FIG. 2 illustrates another embodiment of the invention showing the accessing of vehicle by a user 102 by the user device 104. The user 102 may initiate a command from the user device 104. In particular, the command may be transmitted by a user application configured on the user device 104 as described above. The command transmitted from the user device 104 is received by the first device 106. The first device may send the command to the second device 108 or to a device 114 (for example, a vehicle) associated with the first device. If the command is intended for the second device 108, the command is transmitted to the second device 108. The command may be utilized to establish communication between the first device 106 and the second device 108 as discussed above.

Alternatively, if the command is intended for another device 114 such as the vehicle, the command is transmitted accordingly. The different types of command are configured on the user application available on the user device 104. As an example, one of the command may be a lock/unlock command to lock/unlock the vehicle 114. The lock/unlock command is transmitted to the vehicle 114 via the first device 106 for intended operation. Another device may be unlocked as shown 116.

As another example, there may be a different command to lock/unlock the second device 108. The command will accordingly lock/unlock the second device 108. The command may be authorized by the second device and accordingly, the unlock command to the second device 108 may be used to access accessing modules 110 from the second device 108 placed inside the second device 108. Accordingly, the accessing modules 110 (keys) may be used to drive 112 the vehicle 114.

Therefore, there is a technical advantage of secure operations on different device such as the second device and the vehicle.

Figure 3:
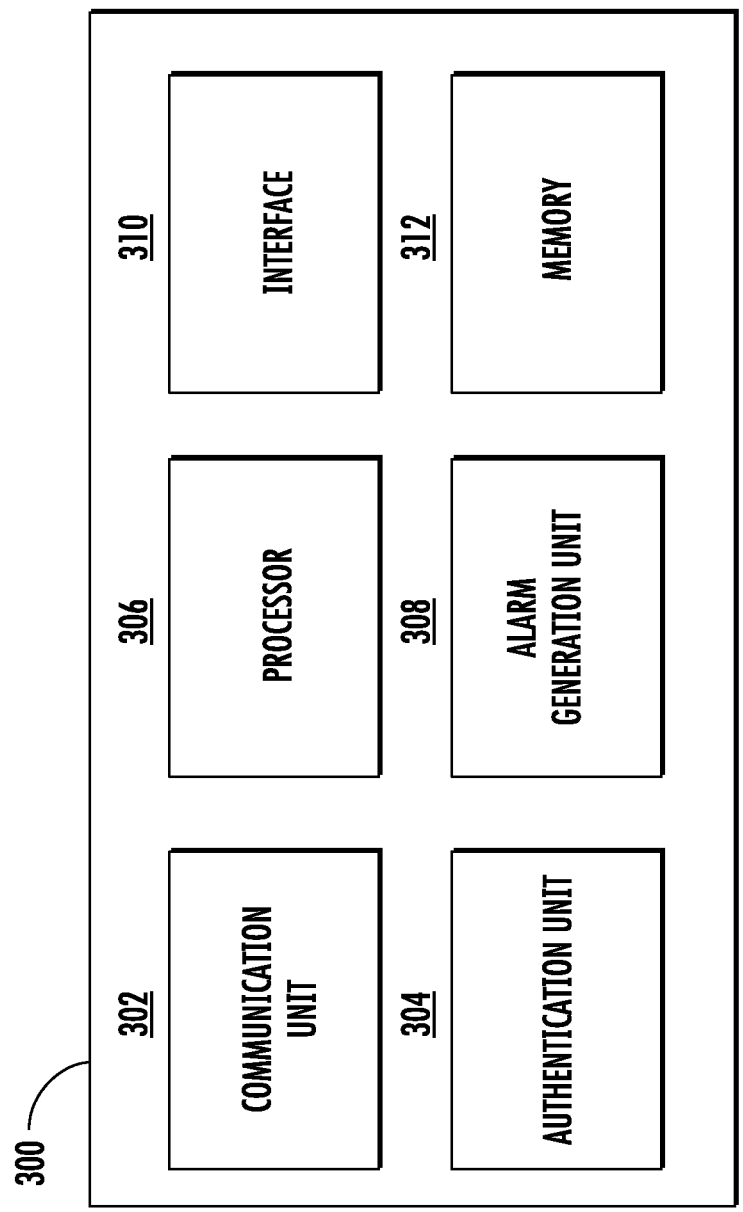
FIG. 3 is an exemplary block diagram showing different components of a first device according to an embodiment of the invention.

FIG. 3 depicts the different components of a first device 300 having same functionalities of the first device as described in FIG. 1 and FIG. 2. The first device 300 comprises a communication unit 302, an authentication unit 304, a controller or processor 306, an alarm generation unit 308, an interface 310, and a memory 312 which work together to achieve the different functions that are performed by the first device 300. As discussed above, the first device 300 receives a command from the user device via the communication unit 302. On receiving the command from the user device, the user device may be authenticated by the authentication unit 304. The authentication unit 304 determines whether the command is received from a valid user device. On confirmation, the communication unit 302 transmits the command to a second device. As discussed above, the command may be received from the user device via the second device. The processor 306 and memory 312 are used to process the command and other communication with the user device and the second device. The first device 300 also comprises an interface 310 for various connection and input provided to the first device 300. If an alert is generated by the second device, the first device may generate an alarm or siren as discussed above. In particular, the processor 306 may send the alarm in the form of siren or hooters for the concerned user.

The different units described herein are exemplary. The invention may be performed using one or more units. For example, the tasks executed by the communication unit 302, the authentication unit 304, the controller or the processor 306, the alarm generation unit 308, the interface 310, and the memory 312 may be performed by a single unit. Alternatively, more number of units as described herein may be used to perform the invention.

Figure 4:
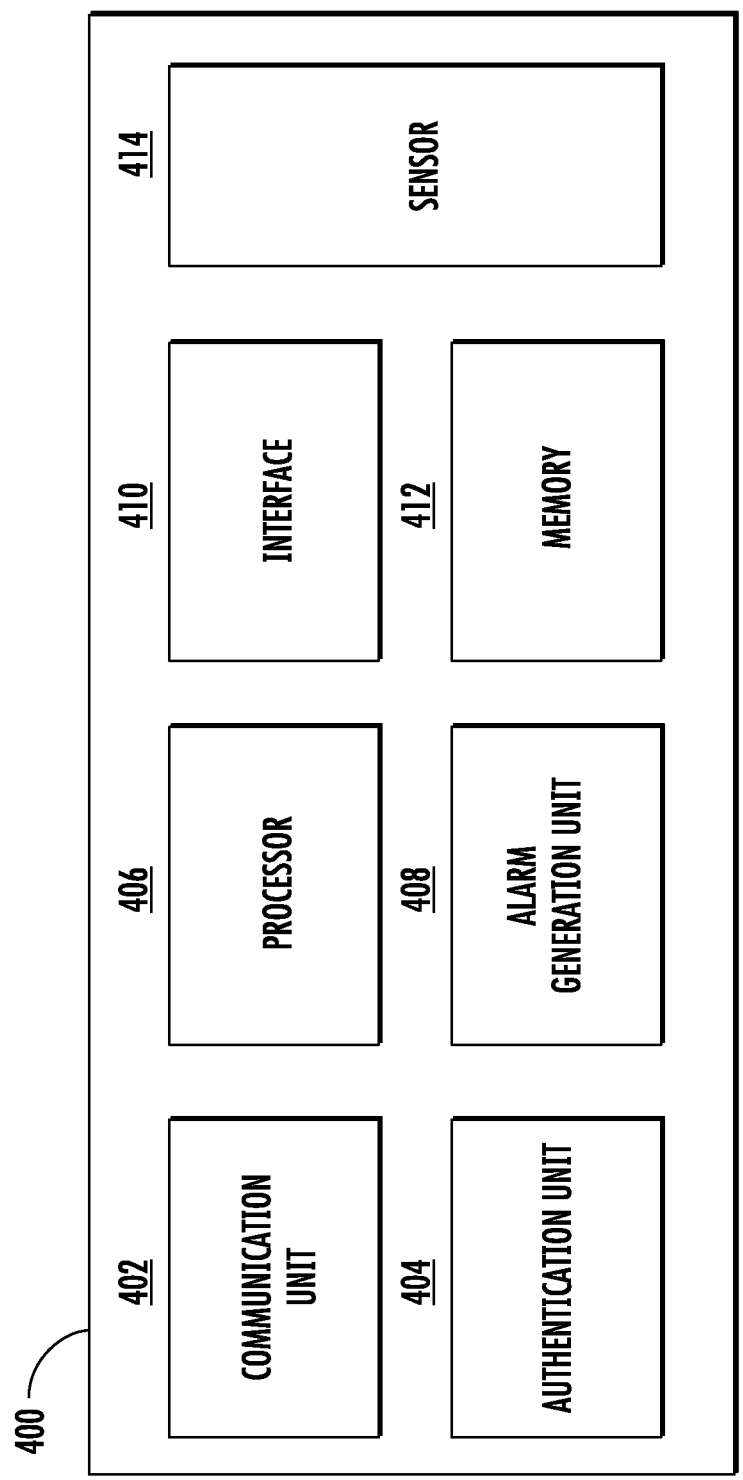
FIG. 4 is an exemplary block diagram showing different components of a second device according to an embodiment of the invention.

FIG. 4 illustrates different components of a second device 400 having same functionalities of the second device as described in FIG. 1 and FIG. 2. The second device 400 comprises a communication unit 402, a validation unit 404, a controller or processor 406, an alert generation unit 408, an interface 410, a memory 412, and a sensor 414 which work together to achieve the different functions that are performed by the second device 400. As discussed above, the second device 400 receives a command from the first device 300 via the communication unit 402. The second device 400 may also receive the command directly from the user device. On receiving the command, the second device may determine the user device associated with the command using the validation unit 404. The validation unit 404 determines whether the command is received from a valid user device. On confirmation, the communication unit 402 establishes a communication with the first device. In particular, the second device 400 establishes a dedicated bidirectional communication with the first device 300. The processor 406 and memory 412 are used to process the command and other communication with the user device and the first device. The second device 400 also comprises an interface 410 for various connection and input provided by the user device 104 and the first device 300. On event of tampering of the second device 400, the sensor 414 may detect the tampering or unauthorized access of the second device. On sensing the unauthorized access by the sensor 414, the tampering may be reported to the processor 406 which initiates instructions to the alert generation unit 408. Alternately, the unauthorized access may be reported to the alert generation unit 408 directly. The alert generation unit 408 issues an alert which is transmitted by the communication unit 402 to the first device 300.

The different units described herein are exemplary. The invention may be performed using one or more units. For example, the tasks executed by the communication unit 402, the validation unit 404, the processor 406, the alert generation unit 408, the interface 410, the sensors 414, and the memory 412 may be performed by a single unit. Alternatively, more number of units as described herein may be used to perform the invention.

Figure 5:
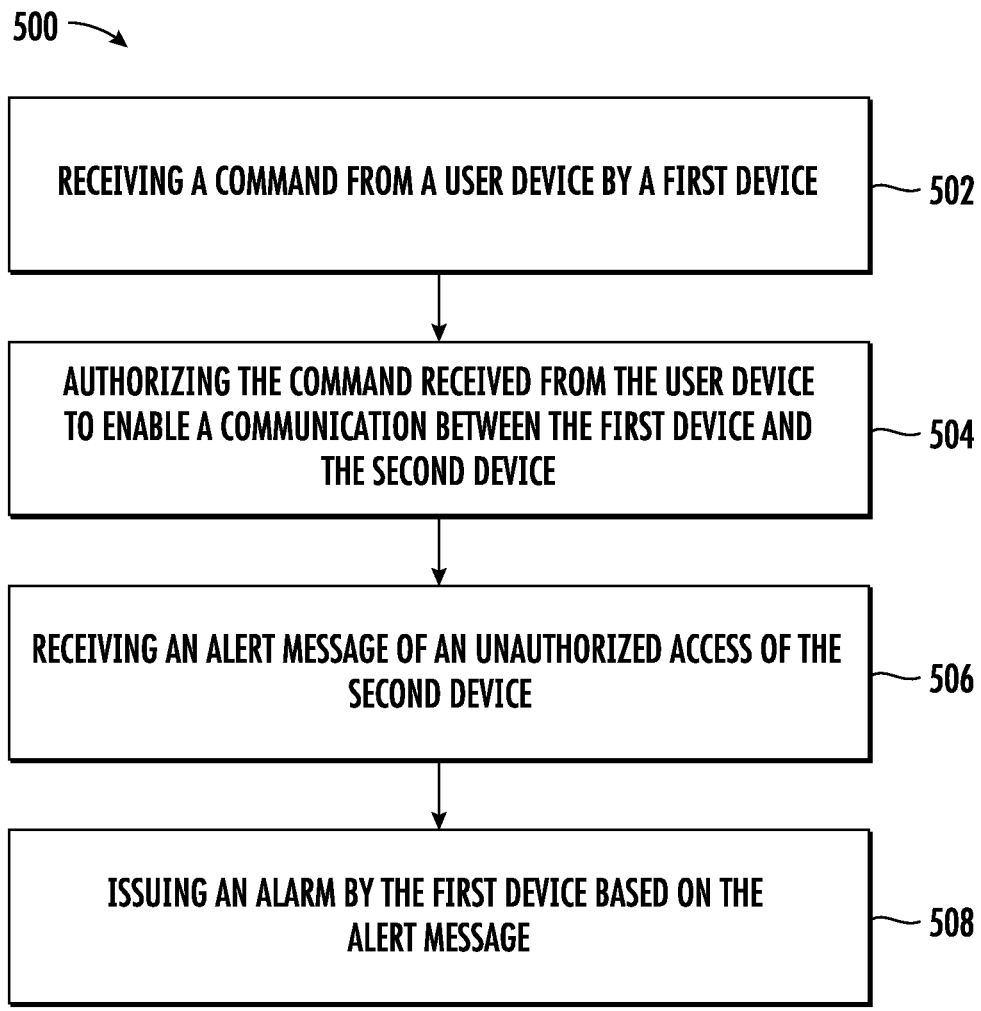
FIG. 5 is an exemplary flowchart illustrating a method to perform the invention according to an embodiment of the invention.

FIG. 5 depicts a flowchart outlining the features of the invention in an embodiment of the invention. The flowchart 500 describes a method being performed for enabling the invention. The method starts at 502 with receiving command from a user device on a first device.

At 504, the command is authorized to enable a communication between a first device and the second device as described above.

The method may further report an alert message received from the second device if there is an unauthorized access of the second device 506.

The first device further issues an alarm based on the alert message generated by the second device 508 as described above.

The invention may be used in various premises including large buildings, parking lots, and safes for keeping valuable items. The invention may further find the application in godowns, storage areas, large buildings, hotels, malls and the like.

Another embodiment of the invention discloses a computer readable medium comprising one or more processors and a memory coupled to the one or more processors. The memory stores instructions which are executed by the one or more processors, the one or more processors are operable to provide enhanced security in the access control systems. The one or more processors are configured to receive a command from a user device. The one or more processors are configured to authorize the command received from the user device. On authorizing the command, a communication is established between the first device and the second device. In an event of tampering of the second device, the one or more processors are configured to receive an alert message generated by the second device. The one or more processors are further configured to issue an alarm based on the alert message received from the second device.

Exemplary computer readable media includes flash memory drives, digital versatile discs (DVDs), compact discs (CDs), floppy disks, and tape cassettes. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. Computer storage media are tangible and mutually exclusive to communication media. Computer storage media are implemented in hardware and exclude carrier waves and propagated signals. Computer storage media for purposes of this invention are not signals per se. Exemplary computer storage media include hard disks, flash drives, and other solid-state memory. In contrast, communication media typically embody computer readable instructions, data structures, program modules, or other data in a modulated data signal such as a carrier wave or other transport mechanism and include any information delivery media.

Although described in connection with an exemplary computing system environment, examples of the invention are capable of implementation with numerous other general purpose or special purpose computing system environments, configurations, or devices.

Examples of the invention may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the Figures/Tables and described herein. Other examples of the invention may include different computer-executable instructions or components having more or less functionality than illustrated and described herein. Aspects of the invention transform a general-purpose computer into a special-purpose computing device when configured to execute the instructions described herein.

The order of execution or performance of the operations in examples of the invention illustrated and described herein is not essential, unless otherwise specified. That is, the operations may be performed in any order, unless otherwise specified, and examples of the invention may include additional or fewer operations than those disclosed herein. For example, it is contemplated that executing or performing a particular operation before, contemporaneously with, or after another operation is within the scope of aspects of the invention.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," "data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

When introducing elements of aspects of the invention or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C".

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method for detecting unauthorized access or a physical attack of a security system including a user device, a first device and a second device, the method comprising:
   receiving a first command from the user device by the first device;
   authorizing the first command to enable a communication between the first device and the second device;
   generating an alert message at the second device when there is a physical attack or an unauthorized access on the second device;
   receiving the alert message at the first device from the second device; and
   issuing an alarm by the first device based on the alert message;
   wherein the first device is an on-board diagnostics device associated with a vehicle and the second device is a lockbox containing a key to the vehicle.

2. The method of claim 1, wherein the first command is transmitted from the user device to the second device and then transmitted to the first device.

3. The method of claim 1, wherein the alert message is issued by the second device to the first device after enabling the communication between the first device and the second device.

4. The method of claim 1, wherein issuing the alarm by the first device comprises sending one or more signals via an interface associated with the first device to cause a vehicle to enter an alarm state.

5. The method of claim 1, wherein the alert message generated by the second device is sent to a plurality of first devices, wherein each of the plurality of first devices issue an alarm to enter an alarm state.

6. The method of claim 1, wherein the alarm issued by the first device is transmitted to a third device, wherein the third device is a camera to take images, a siren, flashing lights, or a device to send message to an authority.

7. The method of claim 1, wherein the first command is transmitted from the user device to the first device and then transmitted to the second device to enable a communication between the first device and the second device.

8. The method of claim 1, wherein the second device receives a second command from a user device to lock/unlock the second device.

9. The method of claim 1, wherein the second device comprises an accessing module communicably coupled with the first device, wherein the accessing module communicates with the first device to access a vehicle.

10. The method of claim 1, wherein the second device is located inside the vehicle, wherein the second device is enabled to communicate with the first device on receiving the first command from the user device.

11. A security system comprising:
    a user device configured to communicate with a first device and a second device, wherein the first device receives a first command from the user device; and
    the second device enabled to communicate with the first device after authorization of the first command by the first device;
    wherein the second device generates an alert message at the second device when there is a physical attack or an unauthorized access on the second device;
    wherein the second device is configured to send the alert message to the first device;
    wherein the first device issues an alarm based on the alert message
    wherein the first device is an on-board diagnostics device associated with a vehicle and the second device is a lockbox containing a key to the vehicle.

12. The system of claim 11, wherein the first command is transmitted from the user device to the second device and then transmitted to the first device.

13. The system of claim 11, wherein the second device comprises an accessing module communicably coupled with the first device, wherein the accessing module communicates with the first device to access a vehicle.

14. The system of claim 11, wherein the second device is located inside the vehicle, wherein the second device is enabled to communicate with the first device on receiving a second command from the user device.

15. The system of claim 11, wherein the alert message is issued by the second device to the first device after enabling the communication between the first device and the second device.

16. A non-transitory computer readable medium storing instructions executed by one or more processors, the one or more processors configured to
    execute the method of claim 1.

* * * * *